US012634054B2

(12) United States Patent
Lu et al.

(10) Patent No.: US 12,634,054 B2
(45) Date of Patent: May 19, 2026

(54) RETRANSMISSION METHOD AND COMMUNICATION APPARATUS

(71) Applicant: HUAWEI TECHNOLOGIES CO., LTD., Shenzhen (CN)

(72) Inventors: Yuchun Lu, Beijing (CN); Liang Li, Beijing (CN); Lin Ma, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 590 days.

(21) Appl. No.: 18/147,526

(22) Filed: Dec. 28, 2022

(65) Prior Publication Data

US 2023/0136077 A1     May 4, 2023

Related U.S. Application Data

(63) Continuation of application No. PCT/CN2021/102519, filed on Jun. 25, 2021.

(30) Foreign Application Priority Data

Jun. 29, 2020    (CN) .......................... 202010606226.1

(51) Int. Cl.
  H04L 1/1867          (2023.01)
  H04L 1/00             (2006.01)
          (Continued)

(52) U.S. Cl.
  CPC .......... H04L 1/1887 (2013.01); H04L 1/0061 (2013.01); H04L 1/1812 (2013.01); H04L 1/1864 (2013.01)

(58) Field of Classification Search
  CPC ... H04L 1/1887; H04L 1/0061; H04L 1/1812; H04L 1/1864
          (Continued)

(56) References Cited

U.S. PATENT DOCUMENTS

| | | | | |
|---|---|---|---|---|
| 11,057,839 B1 * | 7/2021 | Saha | ...................... | H04W 52/50 |
| 2011/0099446 A1 * | 4/2011 | Murakami | ........... | H04L 1/0071 |
| | | | | 714/E11.131 |

FOREIGN PATENT DOCUMENTS

| | | | |
|---|---|---|---|
| CN | 111181700 A | 5/2020 | |
| EP | 1580917 A2 * | 9/2005 | ........... H04L 1/1854 |
| WO | 2006090450 A1 | 8/2006 | |

OTHER PUBLICATIONS

Frazier, "The 802.3z Gigabit Ethernet Standard," IEEE 802 Perspectives, IEEE Network, vol. 12, Issue 3, May-Jun. 1998, 7 pages.

(Continued)

*Primary Examiner* — Asad M Nawaz
*Assistant Examiner* — Hugh Mark Ashley
(74) *Attorney, Agent, or Firm* — Fish & Richardson P.C.

(57)          ABSTRACT

This disclosure provides a retransmission method and a communication apparatus, applicable to a wireless or wired communication system. One example method includes: After receiving a signal from a second device, a first device performs first decoding on the signal, then determines whether an error occurs in the signal and a first quantity, and determines, based on a relationship between the first quantity and a first threshold, whether to request the second device to send a first data block, where the first quantity is a quantity of errors that occur in the signal received from the second device, the signal is used to transmit the first data block, and the first threshold is a maximum quantity of errors that can be corrected when the first device decodes the first data block.

20 Claims, 8 Drawing Sheets

(51) Int. Cl.
    *H04L 1/1812*       (2023.01)
    *H04L 1/1829*       (2023.01)

(58) Field of Classification Search
    USPC ......................................................... 370/328
    See application file for complete search history.

(56)                     References Cited

OTHER PUBLICATIONS

IEEE 802.3ae-2002, "IEEE Standard for Information technology-Local and metropolitan area networks; Part 3: Carrier Sense Multiple Access with Collision Detection (CSMA/CD) Access Method and Physical Layer Specifications; Amendment 1: Media Access Control (MAC) Parameters, Physical Layer, and Management Parameters for 10 GB/s Operation," IEEE Computer Society, Aug. 30, 2002, 529 pages.
IEEE 802.16-2017, "IEEE Standard for Air Interface for Broadband Wireless Access Systems, IEEE Computer Society and the IEEE Microwave Theory and Techniques Society," Dec. 6, 2017, 2726 pages.
Extended European Search Report in European Appln No. 21833295.5, dated Nov. 6, 2023, 11 pages.

* cited by examiner

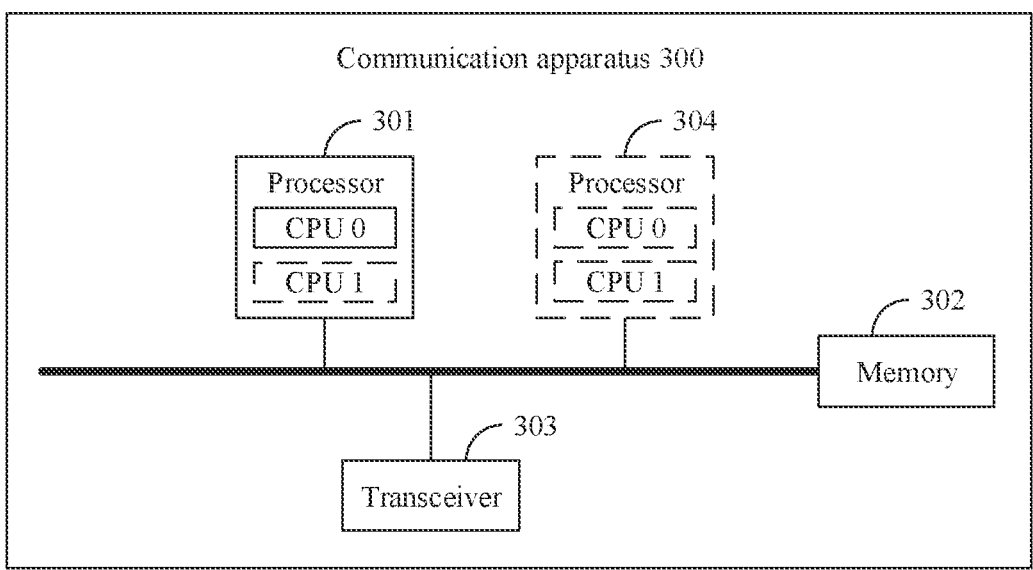

FIG. 3

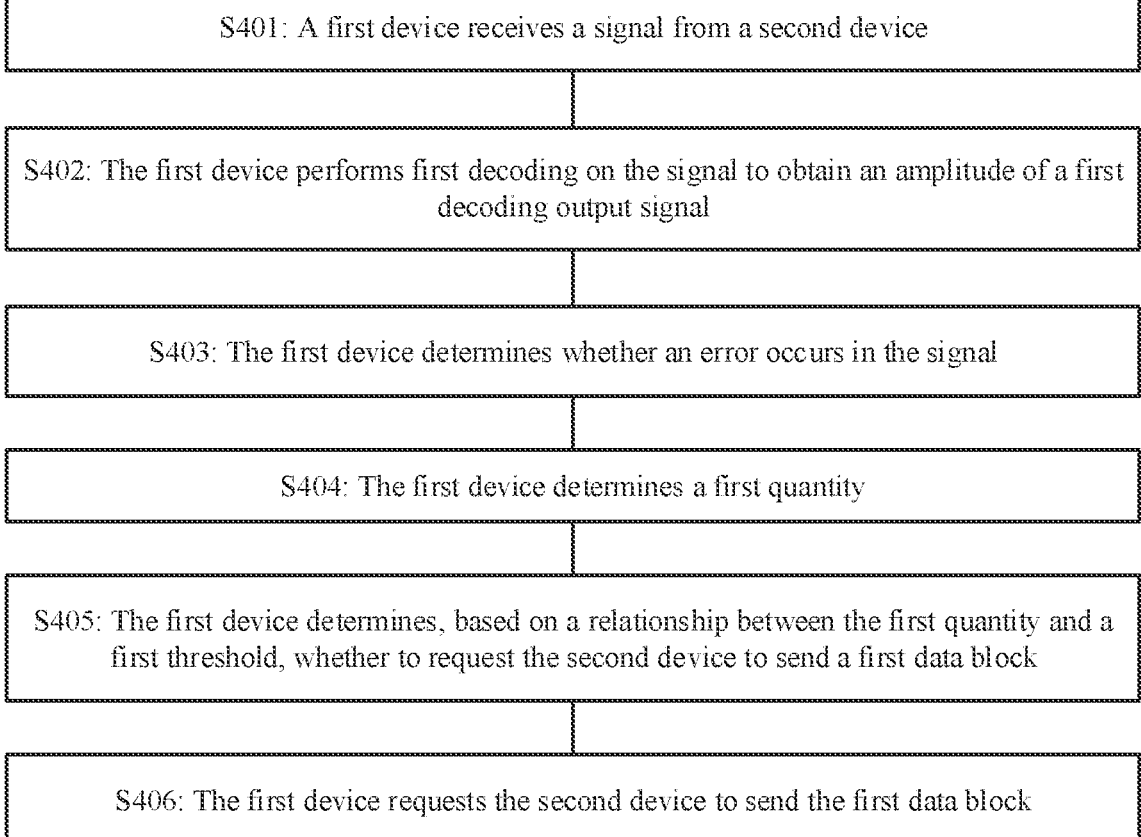

S401: A first device receives a signal from a second device

S402: The first device performs first decoding on the signal to obtain an amplitude of a first decoding output signal S403: The first device determines whether an error occurs in the signal S404: The first device determines a first quantity S405: The first device determines, based on a relationship between the first quantity and a first threshold, whether to request the second device to send a first data block S406: The first device requests the second device to send the first data block

FIG. 4

| Symbol identifier | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Input of a 1/(1 + D) encoder | 1 | 0 | 1 | 3 | 3 | 0 | 3 | 2 | 0 | 1 | 3 | 3 | 0 | 3 | 2 | 1 | 1 | 0 | 3 | 3 |
| Output of the 1/(1 + D) encoder | 1 | 3 | 2 | 1 | 2 | 2 | 1 | 1 | 3 | 2 | 1 | 2 | 2 | 1 | 1 | 0 | 1 | 3 | 0 | 3 |
| Output of a channel | 1 | 4 | 5 | 3 | 3 | 4 | 3 | 2 | 4 | 5 | 3 | 3 | 4 | 3 | 2 | 1 | 1 | 4 | 3 | 3 |
| Input of a DFE | 1 | 4 | (4) | 3 | 3 | 4 | 3 | 2 | 4 | 5 | 3 | 3 | 4 | 3 | 2 | 1 | 1 | 4 | 3 | 3 |
| Input of a DFE slicer | 1 | 3 | 1 | 2 | 1 | 3 | 0 | 2 | 2 | 3 | 0 | 3 | 1 | 2 | 0 | 1 | 0 | (4) | 0 | 3 |
| Output of the DFE | 1 | 3 | 1 | 2 | 1 | 3 | 0 | 2 | 2 | 3 | 0 | 3 | 1 | 2 | 0 | 1 | 0 | 3 | 0 | 3 |
| EoBD | 0 | 0 | 0 | 0 | 0 | 0 | 0 | 0 | 0 | 1 | 0 | 0 | 0 | 0 | 0 | 0 | 0 | 1 | 0 | 0 |
| Output of a (1 + D) decoder | 1 | 0 | 0 | 3 | 3 | 0 | 3 | 2 | 0 | 1 | 3 | 3 | 0 | 3 | 2 | 1 | 1 | 0 | 3 | 3 |

FIG. 6

| Symbol identifier | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Input of a 1/(1 + D) encoder | 1 | 0 | 1 | 3 | 3 | 0 | 3 | 2 | 0 | 1 | 3 | 3 | 0 | 3 | 2 | 1 | 1 | 0 | 3 | 3 |
| Output of the 1/(1 + D) encoder | 1 | 3 | 2 | 1 | 2 | 2 | 1 | 1 | 3 | 2 | 1 | 2 | 2 | 1 | 1 | 0 | 1 | 3 | 0 | 3 |
| Output of a channel | 1 | 4 | 5 | 3 | 3 | 4 | 3 | 2 | 4 | 5 | 3 | 3 | 4 | 3 | 2 | 1 | 1 | 4 | 3 | 3 |
| Output of a 7-level slicer | 1 | 4 | (4) | 3 | 3 | 4 | 3 | 2 | 4 | 5 | 3 | 3 | 4 | 3 | 2 | 1 | 1 | (4) | 3 | 3 |
| Output of a 1/(1 + D) decoder | 1 | 3 | 1 | 2 | 1 | 3 | 0 | 2 | 2 | 3 | 0 | 3 | 1 | 2 | 0 | 1 | 0 | 4 | 0 | 3 |
| Output corrected by the 1/(1 + D) decoder | 1 | 3 | 1 | 2 | 1 | 3 | 0 | 2 | 2 | 3 | 0 | 3 | 1 | 2 | 0 | 1 | 0 | 3 | 0 | 3 |
| EoBD | 0 | 0 | 0 | 0 | 0 | 0 | 0 | 0 | 0 | 0 | 0 | 0 | 0 | 0 | 0 | 0 | 0 | 1 | 0 | 0 |
| Output of a (1 + D) decoder | 1 | 0 | 0 | 3 | 3 | 0 | 3 | 2 | 0 | 1 | 3 | 3 | 0 | 3 | 2 | 1 | 1 | 0 | 3 | 3 |

FIG. 8

RETRANSMISSION METHOD AND COMMUNICATION APPARATUS

CROSS-REFERENCE TO RELATED APPLICATIONS

This application is a continuation of International Application No. PCT/CN2021/102519, filed on Jun. 25, 2021, which claims priority to Chinese Patent Application No. 202010606226.1, filed on Jun. 29, 2020. The disclosures of the aforementioned applications are hereby incorporated by reference in their entireties.

TECHNICAL FIELD

This disclosure relates to the communications field, and in particular, to a retransmission method and a communication apparatus.

BACKGROUND

Continuous deterioration of a channel transmission environment causes a decrease in a signal-to-noise ratio and an increase in a bit error rate. Further, the following technical solutions are proposed to improve bit error performance in the case of a low signal-to-noise ratio.

For example, an automatic repeat-request (ARQ) technology implements cyclic redundancy check (CRC) at a data link layer (DLL). Specifically, a data receiving device performs cyclic redundancy check on data, and if the check fails, requests a data sending device to resend corresponding data, to reduce a bit error rate. However, in a scenario in which a bit error rate is high, because link quality is poor, a quantity of retransmission times is large, and data transmission reliability is low.

A technology combining the ARQ and forward error correction (FEC) is referred to as a hybrid automatic repeat request (HARQ) technology. In the FEC technology, the data receiving device may correct error data according to a decoding algorithm. The HARQ technology implements a hybrid automatic repeat request function at a media access control (MAC) layer. For example, in an RS (132, 128)+ CRC32 solution, an error correction process in this solution is simple, and a low latency requirement of data transmission can be met. However, an error correction capability is weak, and when a bit error rate is high, it is difficult to meet a reliability requirement of data transmission. For another example, in an RS (544, 514)+CRC32 solution, an error detection capability of the solution is strong, and a reliability requirement can be met when a bit error rate of a link is high. However, an error detection process is more complex, and it is difficult to meet a low latency requirement of data transmission.

In other words, in a conventional technology, both communication requirements in two aspects: a low latency and high reliability of data transmission cannot be considered.

SUMMARY

Embodiments of this disclosure provide a retransmission method and an apparatus, to meet communication requirements of both a low latency and high reliability of data transmission, and improve data transmission efficiency and data transmission reliability.

To achieve the foregoing objective, this disclosure uses the following technical solutions.

According to a first aspect, a retransmission method is provided. The retransmission method includes: The first device determines a first quantity, and determines, based on a relationship between the first quantity and a first threshold, whether to request a second device to send a first data block. The first quantity is a quantity of errors that occur in a signal received from the second device, and the signal is used to transmit the first data block. The first threshold is a maximum quantity of errors that can be corrected when the first device decodes the first data block.

Based on the retransmission method in the first aspect, the first device may count a quantity of errors that occur in a physical layer signal, corresponding to the first data block, received from the second device, and determine, based on the quantity of errors that occur in the signal and a decoding error correction capability of the first device, for example, a maximum quantity of errors that can be corrected when the first device performs decoding, whether to request the second device to resend the first data block. In this way, before the first data block is decoded and checked, error information is extracted from the physical layer signal, so that a data transmission latency can be reduced, and an error detection capability of the first device can be improved, thereby improving data transmission efficiency and data transmission reliability.

Optionally, that the error occurs in the signal includes: an amplitude of a first decoding output signal is less than a first boundary value or greater than a second boundary value. The second boundary value is greater than the first boundary value, and the amplitude of the first decoding output signal is determined based on an amplitude of a current first decoding input signal and an amplitude of a previous first decoding output signal. In other words, an amplitude range of the signal is from the first boundary value to the second boundary value. When the amplitude of the first decoding output signal falls outside the amplitude range of the signal, it may be determined that the error occurs in the signal.

Optionally, an amplitude threshold of the signal includes a first amplitude threshold, a second amplitude threshold, a third amplitude threshold, and a fourth amplitude threshold, the first amplitude threshold is less than the second amplitude threshold, the second amplitude threshold is less than the third amplitude threshold, and the third amplitude threshold is less than the fourth amplitude threshold. The first boundary value N is: $N=M-a*d1$. a is a factor, $0<a\le1$, d1 is an amplitude interval between adjacent amplitude thresholds, and M is the first amplitude threshold. The second boundary value K is $K=P+a*d1$. a is a factor, $0<a\le1$, d1 is an amplitude interval between adjacent amplitude thresholds, and P is the fourth amplitude threshold.

In a possible design solution, the retransmission method may further include: determining an amplitude of the signal based on an amplitude interval between the amplitude of the first decoding output signal and the amplitude threshold of the signal. In other words, the amplitude of the first decoding output signal may be determined as one of amplitude thresholds included in the signal.

In a possible design solution, the determining an amplitude of the signal based on an amplitude interval between the amplitude of the first decoding output signal and the amplitude threshold of the signal may include: if the amplitude of the first decoding output signal is less than the first boundary value, determining the amplitude of the signal as the first amplitude threshold; or if the amplitude of the first decoding output signal is greater than the second boundary value, determining the amplitude of the signal as the fourth amplitude threshold. In other words, if the error occurs in the signal, the amplitude of the first decoding output signal may be determined as one of the amplitude thresholds included in the signal, and the amplitude of the first decoding output signal is corrected, thereby improving data transmission reliability.

In a possible design solution, that the first device determines, based on a relationship between the first quantity and a first threshold, whether to request a second device to send a first data block may include: if the first quantity is greater than the first threshold, the first device requests the second device to send the first data block. In other words, if the quantity of errors that occur in the signal is greater than the decoding error correction capability of the first device, for example, the maximum quantity of errors that can be corrected when the first device performs decoding, the second device may be requested to resend the first data block.

In a possible design solution, the retransmission method may further include: The first device decodes the first data block, and/or performs cyclic redundancy check on the first data block. In other words, the first data block may be decoded by using an FEC technology, and/or cyclic redundancy check may be performed on the first data block by using a CRC technology, to further reduce a probability of occurrence of missed error detection, thereby improving data transmission reliability.

In a possible design solution, the retransmission method may further include: if the first quantity is less than or equal to the first threshold and meets a first condition, requesting the second device to send the first data block. The first condition includes that the first data block fails to be decoded and/or the first data block fails to be checked. In other words, when the first quantity is less than or equal to the first threshold, the FEC technology and the CRC technology may be used to further reduce a probability of missed error detection, thereby improving data transmission reliability.

In another possible design solution, the retransmission method may further include: if a second condition is met, the first device requests the second device to send the first data block. The second condition may include one or more of the following: the first quantity is greater than the first threshold, the first data block fails to be decoded, or the first data block fails to be checked In other words, when any one or more of the conditions included in the second condition are met, the first device may request the second device to send the first data block, thereby improving data transmission reliability.

In still another possible design solution, the retransmission method may further include: if the first quantity is greater than the first threshold and meets a third condition, the first device requests the second device to send the first data block. The third condition may include that the first data block is successfully decoded and/or the first data block is successfully checked. This can resolve a problem of low data transmission reliability caused by incorrect correction in a process of decoding the first data block. In other words, when it is determined that the first quantity is greater than the first threshold, decoding succeeds. This may be because incorrect correction occurs, and error data is actually not corrected. In this case, the first device may request to retransmit the first data block, to improve data transmission reliability.

Optionally, the first data block includes an FEC codeword, a CRC frame, an Ethernet frame, or a specified bit set.

According to a second aspect, a communication apparatus is provided. The communication apparatus includes a transceiver module and a processing module.

The processing module is configured to determine a first quantity. The first quantity is a quantity of errors that occur in a signal received from a second device, and the signal is used to transmit a first data block.

The processing module is further configured to determine, based on a relationship between the first quantity and a first threshold, whether to control the transceiver module to request the second device to send the first data block. The first threshold is a maximum quantity of errors that can be corrected when the processing module decodes the first data block.

Optionally, that the error occurs in the signal may include: an amplitude of a first decoding output signal is less than a first boundary value or greater than a second boundary value. The second boundary value is greater than the first boundary value, and the amplitude of the first decoding output signal is determined based on an amplitude of a current first decoding input signal and an amplitude of a previous first decoding output signal.

Optionally, an amplitude threshold of the signal includes a first amplitude threshold, a second amplitude threshold, a third amplitude threshold, and a fourth amplitude threshold, the first amplitude threshold is less than the second amplitude threshold, the second amplitude threshold is less than the third amplitude threshold, and the third amplitude threshold is less than the fourth amplitude threshold. The first boundary value N is: $N=M-a*d1$. a is a factor, $<a\le1$, d1 is an amplitude interval between adjacent amplitude thresholds, and M is the first amplitude threshold. The second boundary value K is $K=P+a*d1$. a is a factor, $0<a\le1$, d1 is an amplitude interval between adjacent amplitude thresholds, and P is the fourth amplitude threshold.

In a possible design solution, the processing module is further configured to determine an amplitude of the signal based on an amplitude interval between the amplitude of the first decoding output signal and the amplitude threshold of the signal.

In a possible design solution, the processing module is further configured to: if the amplitude of the first decoding output signal is less than the first boundary value, determine the amplitude of the signal as the first amplitude threshold. The processing module is further configured to: if the amplitude of the first decoding output signal is greater than the second boundary value, determine the amplitude of the signal as the fourth amplitude threshold.

In a possible design solution, the processing module is further configured to: if the first quantity is greater than the first threshold, control the transceiver module to request the second device to send the first data block.

In a possible design solution, the processing module is further configured to decode the first data block; and/or the processing module is further configured to perform cyclic redundancy check on the first data block.

In a possible design solution, the processing module is further configured to: if the first quantity is less than or equal to the first threshold and meets a first condition, control the transceiver module to request the second device to send the first data block, where the first condition includes that the first data block fails to be decoded and/or the first data block fails to be checked.

In another possible design solution, the processing module is further configured to: if a second condition is met, control the transceiver module to request the second device to send the first data block. The second condition may include one or more of the following: the first quantity is greater than the first threshold, the first data block fails to be decoded, or the first data block fails to be checked.

In still another possible design solution, the processing module is further configured to: if the first quantity is greater than the first threshold and meets a third condition, control the transceiver module to request the second device to send the first data block. The third condition may include that the first data block is successfully decoded and/or the first data block is successfully checked.

Optionally, the first data block includes an FEC codeword, a CRC frame, an Ethernet frame, or a specified bit set.

It should be noted that the transceiver module in the second aspect may include a receiving module and a sending module. The receiving module is configured to receive data and/or signaling from the second device. The sending module is configured to send a first request to the second device, where the first request is used to request the second device to send the first data block, or is used to send other data and/or signaling to the second device. A specific implementation of the transceiver module is not specifically limited in this disclosure.

Optionally, the communication apparatus in the second aspect may further include a storage module, and the storage module stores a program or instructions. When the processing module executes the program or the instructions, the communication apparatus in the second aspect is enabled to perform the retransmission method in the first aspect.

It should be noted that the communication apparatus in the second aspect may be a first device, or may be a chip (system) or another component or component that can be disposed in the first device. This is not limited in this disclosure.

In addition, for a technical effect of the communication apparatus in the second aspect, refer to the technical effect of the retransmission method in any possible implementation of the first aspect. Details are not described herein again.

According to a third aspect, a communication apparatus is provided. The communication apparatus includes a processor. The processor is coupled to a memory, and the memory is configured to store a computer program. The processor is configured to execute the computer program stored in the memory, to enable the communication apparatus to perform the retransmission method in any possible implementation of the first aspect.

In a possible design solution, the communication apparatus in the third aspect may further include a transceiver. The transceiver may be a transceiver circuit or an input/output port. The transceiver may be used by the communication apparatus to communicate with another communication apparatus.

In this disclosure, the communication apparatus in the third aspect may be a first device, or a chip or a chip system disposed inside the first device.

In addition, for a technical effect of the communication apparatus in the third aspect, refer to the technical effect of the retransmission method in any implementation of the first aspect. Details are not described herein again.

According to a fourth aspect, a chip system is provided. The chip system includes a processor and an input/output port. The processor is configured to implement a processing function in the first aspect, and the input/output port is configured to implement a receiving and sending function in the first aspect.

In a possible design solution, the chip system further includes a memory, and the memory is configured to store program instructions and data for implementing the function in the first aspect.

The chip system may include a chip, or may include a chip and another discrete component.

According to a fifth aspect, a communication system is provided. The system includes a first device and a second device.

According to a sixth aspect, a computer-readable storage medium is provided, and the computer-readable storage medium stores computer instructions. When the computer instructions are run on a computer, the computer is enabled to perform the retransmission method in any one of the possible implementations of the first aspect.

According to a seventh aspect, a computer program product including instructions is provided, including a computer program or instructions. When the computer program or the instructions are run on a computer, the computer is enabled to perform the retransmission method in any possible implementation of the first aspect.

BRIEF DESCRIPTION OF DRAWINGS

FIG. 3 is a schematic diagram 1 of a structure of a communication apparatus according to an embodiment of this disclosure;

FIG. 4 is a schematic flowchart 1 of a retransmission method according to an embodiment of this disclosure;

FIG. 6 is a schematic diagram 1 of an operation process according to an embodiment of this disclosure;

FIG. 8 is a schematic diagram 2 of an operation process according to an embodiment of this disclosure;

DESCRIPTION OF EMBODIMENTS

The following describes technical solutions of this disclosure with reference to accompanying drawings. In this disclosure, "at least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "I" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may represent a, b, c, a and b, a and c, b and c, or a, b, and c, where a, b, and c each may be singular or plural.

All aspects, embodiments, or features are presented in this disclosure by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this disclosure, terms such as "an example" and "for example" are used to represent giving an example, an illustration, or a description. Any embodiment or design scheme described as "an example" in this disclosure should not be explained as being more preferred or having more advantages than another embodiment or design scheme. Exactly, the word "example" is used to present a concept in a specific manner.

Figure 1:
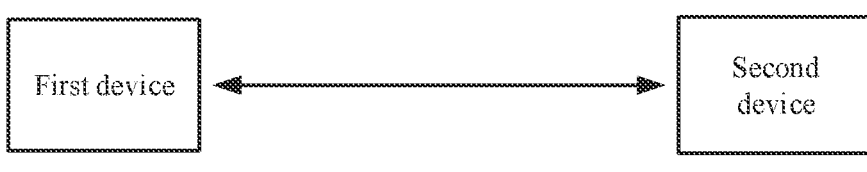
FIG. 1 is a schematic diagram of an architecture of a communication system according to an embodiment of this disclosure.

FIG. 1 is a schematic diagram 1 of an architecture of a communication system to which a retransmission method according to an embodiment of this disclosure is applicable. For ease of understanding embodiments of this disclosure, the architecture of the communication system shown in FIG. 1 is first used as an example to describe in detail an architecture of a communication system applicable to embodiments of this disclosure. The communication system includes a first device and a second device. The second device is configured to send a signal to the first device, where the signal is used to transmit a first data block, and the first device is configured to receive the signal sent by the second device. The first device and the second device may communicate in a wired or wireless manner. The first device and the second device may be integrated together, for example, may be interconnected by using a backplane, or may be separately disposed.

The second device may include a cyclic redundancy check CRC generation module, a forward error correction FEC encoding module, a modulation module, and the like. Modules included in the second device and functions of the modules are not limited in this disclosure. For a specific implementation, refer to the conventional technology.

Figure 2:
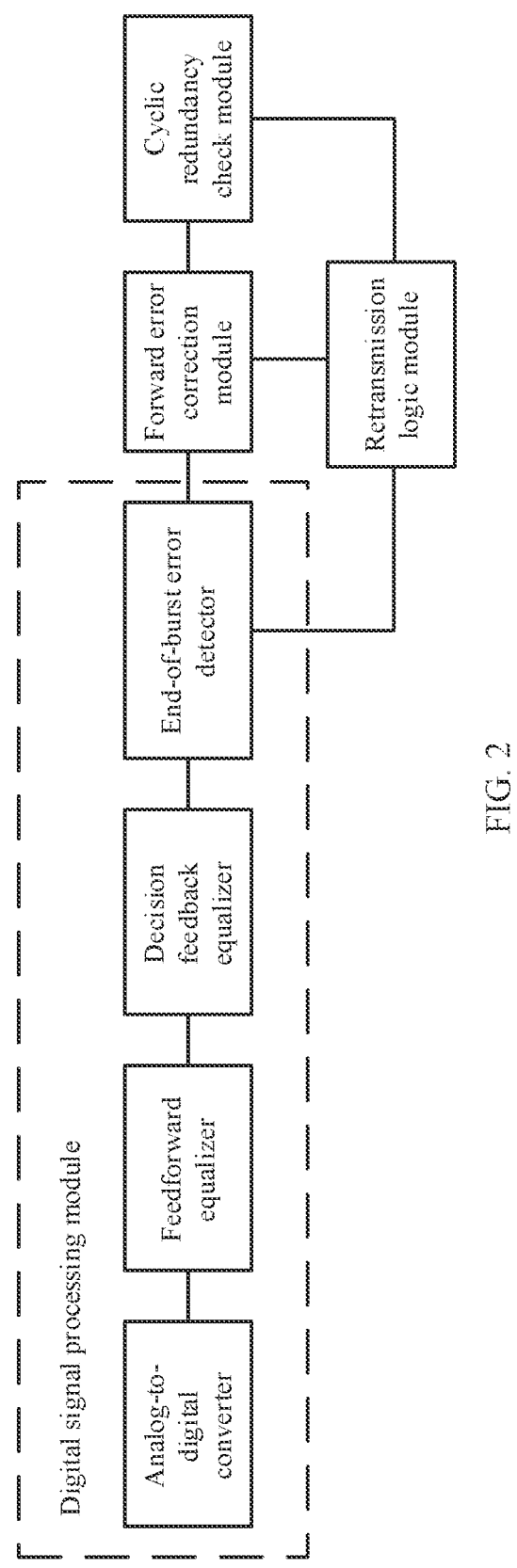
FIG. 2 is a schematic diagram of a structure of a first device according to an embodiment of this disclosure.

FIG. 2 is a schematic diagram of a structure of a first device according to an embodiment of this disclosure. The first device may include a digital signal processing (DSP) module and a retransmission logic module. Optionally, the first device may further include a forward error correction FEC module and/or a cyclic redundancy check CRC module.

The digital signal processing module is applied to a physical layer, and the digital signal processing module may include an analog-to-digital converter (ADC), a feedforward equalizer (FFE), a decision feedback equalizer (DFE), an end-of-burst error detector (EoBD), and the like. Alternatively, the digital signal processing module may include a 7-level slicer and a $1/(1+D)$ decoder. The 7-level slicer and the $1/(1+D)$ decoder may replace the foregoing decision feedback equalizer, to form two different solutions.

The analog-to-digital converter ADC is configured to convert a received analog signal into a digital signal.

The feedforward equalizer FFE is configured to filter a signal and eliminate an intersymbol crosstalk signal.

The decision feedback equalizer DFE is configured to decode a received signal to obtain an amplitude of a decoded signal, and slice an amplitude of the decoded signal, and is further configured to determine whether an error occurs in the signal, and if the error occurs, send error indication information to the EoBD.

The 7-level slicer is configured to make a decision on the received signal.

The $1/(1+D)$ decoder is configured to decode a signal, for example, determine an amplitude of a current decoding output signal based on a difference between an amplitude of a current decoding input signal and an amplitude of a previous decoding output signal, and is further configured to determine whether an error occurs in the signal, and if the error occurs, send error indication information to the EoBD.

The end-of-burst error detection EoBD device is configured to determine, based on the error indication information sent by the decision feedback equalizer DFE or the $1/(1+D)$ decoder, a quantity of errors that occur in a signal received from the second device, and if the quantity of errors is greater than an error correction capability of the first device, send, to the following retransmission logic module, information indicating that the quantity of errors in the signal is greater than the error correction capability of the first device.

The forward error correction FEC module is configured to decode the first data block, send decoding failure information to the following retransmission logic module if the decoding fails, and send decoding success information to the following retransmission logic module if the decoding succeeds.

The cyclic redundancy check CRC module is configured to perform cyclic redundancy check on the first data block, send check failure information to the following retransmission logic module if the check fails, and send check success information to the following retransmission logic module if the check succeeds.

The retransmission logic module is configured to receive information sent by the foregoing end-of-burst error detector EoBD, forward error correction FEC module, and cyclic redundancy check CRC module, and is further configured to determine, based on the information sent by the foregoing end-of-burst error detector, forward error correction FEC module, and cyclic redundancy check CRC module, whether to request the second device to resend the first data block.

It should be noted that the retransmission method provided in this embodiment of this disclosure may be applied to communication between the first device and the second device shown in FIG. 1. It should be understood that FIG. 1 is merely a simplified schematic diagram of an example for ease of understanding. The communication system may further include another device not drawn in FIG. 1. A structure of the first device shown in FIG. 2 does not constitute a limitation on the first device. An actual first device may include components more or fewer than those shown in the figure, or some components may be combined, or different component configurations may be used.

FIG. 3 is a schematic diagram of a structure of a communication apparatus 300 that may be configured to perform a retransmission method according to an embodiment of this disclosure. The communication apparatus 300 may be the first device shown in FIG. 1, or may be a chip (system) or another component or component applied to the first device. As shown in FIG. 3, the communication apparatus 300 may include a processor 301. The communication apparatus 300 may further include a memory 302 and a transceiver 303. The processor 301 is coupled to the memory 302 and the transceiver 303. For example, the processor 301 may be connected to the memory 302 and the transceiver 303 through a communication bus.

The following describes each composition component of the communication apparatus 300 in detail with reference to FIG. 3.

The processor 301 is a control center of the communication apparatus 300, and may be one processor or may be a collective term of a plurality of processing elements. For example, the processor 301 may be one or more central processing units (CPUs), or an application-specific integrated circuit (ASIC), or may be configured as one or more integrated circuits implementing embodiments of this disclosure, for example, one or more microprocessors (DSPs) or one or more field programmable gate arrays (FPGAs).

Optionally, the processor 301 may perform various functions of the communication apparatus 300 by running or executing a software program stored in the memory 302 and invoking data stored in the memory 302.

During specific implementation, in an embodiment, the processor 301 may include one or more CPUs, for example, a CPU 0 and a CPU 1 shown in FIG. 3.

During specific implementation, in an embodiment, the communication apparatus 300 may alternatively include a plurality of processors, for example, the processor 301 and a processor 304 shown in FIG. 3. Each of the processors may be a single-core processor (single-CPU) or may be a multi-core processor (multi-CPU). The processor herein may be one or more communication devices, circuits, and/or processing cores configured to process data (for example, computer program instructions).

Optionally, the memory 302 may be a read-only memory (ROM) or another type of static storage communication device that can store static information and instructions, or a random access memory (RAM) or another type of dynamic storage communication device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that can be accessed by a computer, but is not limited thereto. The memory 302 may be integrated with the processor 301, or may exist independently, and is coupled to the processor 301 through an input/output port (not shown in FIG. 3) of the communication apparatus 300. This is not specifically limited in this embodiment of this disclosure.

The memory 302 is configured to store a software program for performing the solutions of this disclosure, and the processor 301 controls execution of the software program. For the foregoing specific implementation, refer to the following method embodiments. Details are not described herein again.

The transceiver 303 is configured to communicate with another communication apparatus. For example, the communication apparatus 300 is a first device, and the transceiver 303 may be configured to communicate with a second device. In addition, the transceiver 303 may include a receiver and a transmitter (which are not separately shown in FIG. 3). The receiver is configured to implement a receiving function, and the transmitter is configured to implement a sending function. The transceiver 303 may be integrated with the processor 301, or may exist independently, and is coupled to the processor 301 through an input/output port (not shown in FIG. 3) of the communication apparatus 300. This is not specifically limited in this embodiment of this disclosure.

It should be noted that a structure of the communication apparatus 300 shown in FIG. 3 does not constitute a limitation on the communication apparatus. An actual communication apparatus may include more or fewer components than those shown in the figure, or combine some components, or have different component arrangement.

The following describes in detail the retransmission method provided in embodiments of this disclosure with reference to FIG. 4 to FIG. 9.

FIG. 4 is a schematic flowchart 1 of a retransmission method according to an embodiment of this disclosure. The retransmission method may be applied to communication between modules/components included in the first device shown in FIG. 2.

As shown in FIG. 4, the retransmission method includes the following steps.

S401: A first device receives a signal from a second device.

The first device may be a signal receiving device, and the second device may be a signal sending device. The second device may send a signal to the first device, and the signal is used to transmit a first data block.

Optionally, an amplitude threshold of the signal may include a first amplitude threshold, a second amplitude threshold, a third amplitude threshold, and a fourth amplitude threshold, the first amplitude threshold is less than the second amplitude threshold, the second amplitude threshold is less than the third amplitude threshold, and the third amplitude threshold is less than the fourth amplitude threshold.

For example, the signal may be a four-level pulse amplitude modulation (4 pulse amplitude modulation, PAM4) signal. The PAM4 signal uses four different signal levels for signal transmission, for example, $-3$, $-1$, 1, and 3. Each signal symbol period may represent 2-bit logical information (0, 1, 2, 3). In other words, the four signal levels $-3$, $-1$, 1, and 3 may be respectively used to transmit data 0, 1, 2, and 3. A first amplitude threshold of the PAM4 signal may be $-3$ in $-3$, $-1$, 1, 3 or 0 in 0, 1, 2, 3, a second amplitude threshold may be $-1$ in $-3$, $-1$, 1, 3 or 1 in 0, 1, 2, 3, a third amplitude threshold may be 1 in $-3$, $-1$, 1, 3 or 2 in 0, 1, 2, 3, and a fourth amplitude threshold may be 3 in $-3$, $-1$, 1, 3 or 3 in 0, 1, 2, 3.

Optionally, the first data block may include an FEC codeword, a CRC frame, an Ethernet frame, or a specified bit set. The CRC frame is a data unit including valid data and redundancy check bits. Generally, one CRC frame may include one or more FEC codewords, and the specified bit set may also be a specified bit sequence.

Figure 5:
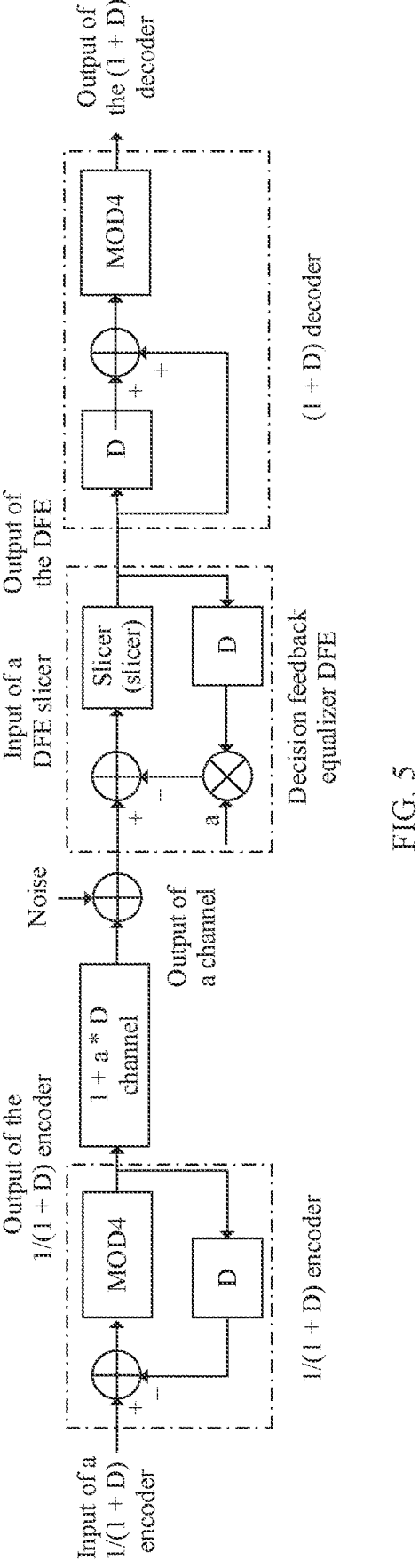
FIG. 5 is a schematic diagram 1 of an operation model according to an embodiment of this disclosure.

FIG. 5 is a schematic diagram 1 of an operation model according to an embodiment of this disclosure. For example, the PAM4 signal sent by the second device passes through a $1+a^*D$ ($0<a\leq1$) channel.

As shown in FIG. 5, the PAM4 signal sequentially passes through a $1/(1+D)$ encoder and the $1+a^*D$ ($0<a\leq1$) channel of the second device, and arrives at the first device after being superimposed with noise. After receiving the signal, the first device performs first decoding and slicing on the signal by using a decision feedback equalizer DFE, and then performs second decoding on the signal by using a $(1+D)$ decoder. If the first device includes an FEC module and/or a CRC module (not shown in FIG. 5), the signal may be input to the FEC module and/or the CRC module.

Before S401, the second device may perform an operation such as coding and modulation on the signal, and then the signal arrives at the first device after passing through the $1+a^*D$ ($0<a\leq1$) channel and being superimposed with noise. With reference to FIG. 5 and FIG. 6, the following uses a $1+a^*D$ channel with a=1 as an example for description.

Step 1: Encode the signal by using the $1/(1+D)$ encoder to obtain an encoded output signal.

For example, the encoding process may include: An amplitude of a current encoding output signal=(an amplitude of a current encoding input signal−an amplitude of a previous encoding output signal) mod 4, where mod is a modulo operation.

With reference to FIG. 6, for example, the first amplitude threshold of the PAM4 signal is 0 in 0, 1, 2, 3, the second amplitude threshold is 1 in 0, 1, 2, 3, the third amplitude threshold is 2 in 0, 1, 2, 3, and the fourth amplitude threshold is 3 in 0, 1, 2, 3. It is assumed that input signals of the 1/(1+D) encoder of the second device at symbol identifiers 1 to 20 are respectively 1, 0, 1, 3, 3, 0, 3, 2, 0, 1, 3, 3, 0, 3, 2, 1, 1, 0, 3, 3.

An amplitude of an encoded output signal at the symbol identifier 1=(an amplitude 1 of an encoded input signal at the symbol identifier 1−an amplitude 0 of a previous encoded output signal) mod 4=1. If the previous encoded output signal of the encoded input signal at the symbol identifier 1 does not exist, it may be considered that the amplitude of the previous encoded output signal is 0.

An amplitude of an encoded output signal at the symbol identifier 2=(an amplitude 0 of an input signal at the symbol identifier 2−the amplitude 1 of the encoded output signal at the symbol identifier 1) mod 4=3.

An amplitude of an encoded output signal at the symbol identifier 3=(an amplitude 1 of an encoded input signal at the symbol identifier 3−the amplitude 3 of the encoded output signal at the symbol identifier 2) mod 4=2.

Similarly, amplitudes of encoded output signals at the symbol identifiers 4 to 20 are obtained by using the foregoing encoding process (as shown in FIG. 6). A specific operation process is not described herein again.

Step 2: The encoded output signal is used as a channel input signal, and passes through a 1+D channel to obtain a channel output signal.

With reference to FIG. 5, an amplitude of a current channel output signal is equal to an amplitude of a current channel input signal plus an amplitude of a previous channel input signal.

With reference to FIG. 6, an amplitude of a channel output signal at the symbol identifier 1=an amplitude 1 of a channel input signal at the symbol identifier 1+an amplitude 0 of a previous channel input signal=1. If the previous channel input signal of the channel output signal at the symbol identifier 1 does not exist, it may be considered that the amplitude of the previous channel input signal is 0.

An amplitude of a channel output signal at the symbol identifier 2=an amplitude 3 of a channel input signal at the symbol identifier 2+the amplitude 1 of the channel input signal at the symbol identifier 1=4.

An amplitude of a channel output signal at the symbol identifier 3=an amplitude 2 of a channel input signal at the symbol identifier 3+the amplitude 3 of the channel input signal at the symbol identifier 2=5.

Similarly, amplitudes of channel output signals at the symbol identifiers 4 to 20 are obtained by using the foregoing channel processing process (as shown in FIG. 6). A specific operation process is not described herein again.

Step 3: Superimpose the channel output signal with noise to obtain an input signal of the DFE, which may also be referred to as a first decoding input signal.

It should be noted that, after the channel output signal is superimposed with the noise, the obtained input signal of the DFE is not necessarily an integer shown in FIG. 6, and may also be a decimal. All input signals of the DFE in FIG. 6 are integers, and are merely an example.

With reference to FIG. 6, if the amplitude 1 of the channel output signal at the symbol identifier 1 is 1 after being superimposed with the noise, an amplitude of an input signal of the DFE at the symbol identifier 1 is 1.

If the amplitude 4 of the channel output signal at the symbol identifier 2 is 4 after being superimposed with the noise, an amplitude of an input signal of the DFE at the symbol identifier 2 is 4.

If the amplitude 5 of the channel output signal at the symbol identifier 3 is 4 after being superimposed with the noise, an amplitude of an input signal of the DFE at the symbol identifier 3 is 4. If there is no noise impact, the amplitude of the input signal of the DFE at the symbol identifier 3 should be equal to the amplitude 5 of the channel output signal at the symbol identifier 3. Therefore, an error occurs herein.

Similarly, the channel output signal is superimposed with the noise to obtain amplitudes of input signals of the DFE at the symbol identifiers 4 to 20 (as shown in FIG. 6). A specific process is not described herein again. Affected by the noise, an error may occur in the amplitudes of the input signals of the DFE at the symbol identifiers 4 to 20. In this embodiment of this disclosure, an example in which no error is introduced in the amplitudes of the input signals of the DFE at the symbol identifiers 4 to 20 is used for description.

Figure 7:
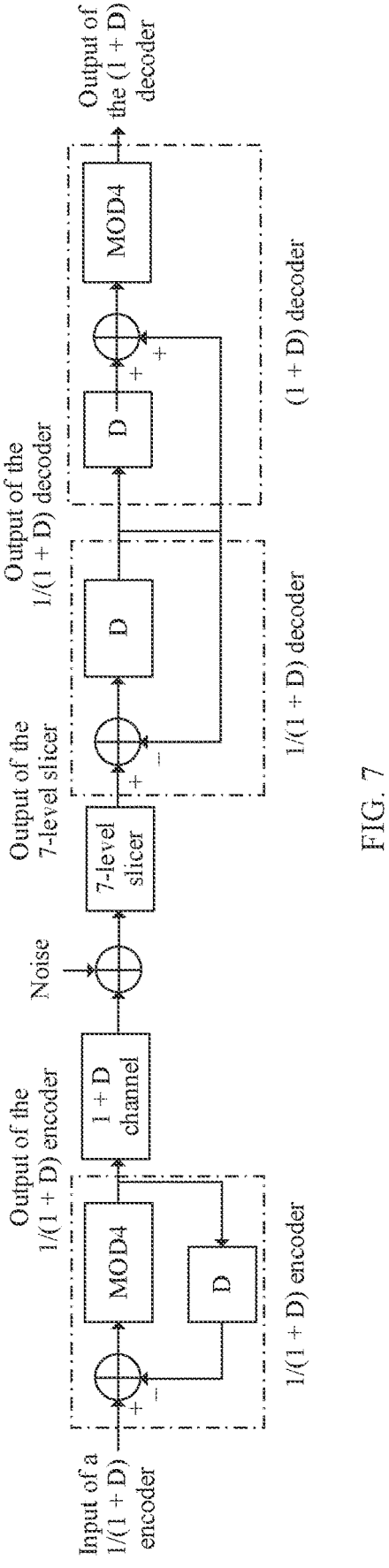
FIG. 7 is a schematic diagram 2 of an operation model according to an embodiment of this disclosure.

FIG. 7 is a schematic diagram 2 of an operation model according to an embodiment of this disclosure. The schematic diagram of the operation model shown in FIG. 7 is applicable only to a 1+D channel scenario. The following describes an example in which the PAM4 signal sent by the second device passes through a 1+D channel.

As shown in FIG. 7, a random four-level signal sequentially passes through a 1/(1+D) encoder and the 1+D channel of the second device, and arrives at the first device after being superimposed with noise. After receiving the signal, the first device slices the signal by using a 7-level slicer (7-level slicer), performs first decoding on the signal by using a 1/(1+D) decoder, and then performs second decoding on the signal by using a (1+D) decoder. If the first device includes an FEC module/or a CRC module (not shown in FIG. 7), the signal may be input to the FEC module and/or the CRC module.

Before S401, the second device may perform an operation such as encoding on the signal, and then the signal arrives at the first device after passing through the 1+D channel and being superimposed with noise. The following provides descriptions with reference to FIG. 7 and FIG. 8.

Step 4: Encode the signal by using the 1/(1+D) encoder to obtain an encoded output signal.

With reference to FIG. 8, for example, the first amplitude threshold of the PAM4 signal is 0 in 0, 1, 2, 3, the second amplitude threshold is 1 in 0, 1, 2, 3, the third amplitude threshold is 2 in 0, 1, 2, 3, and the fourth amplitude threshold is 3 in 0, 1, 2, 3. It is assumed that input signals of the 1/(1+D) encoder of the second device at symbol identifiers 1 to 20 are respectively 1, 0, 1, 3, 3, 0, 3, 2, 0, 1, 3, 3, 0, 3, 2, 1, 1, 0, 3, 3. For the obtained encoding output signal, refer to FIG. 8. For a specific implementation, refer to the foregoing step 1.

Details are not described herein again.

Step 5: The encoded output signal is used as a channel input signal, and passes through the 1+D channel to obtain the channel output signal.

For a threshold of the obtained channel output signal, refer to FIG. 8. For a specific implementation, refer to the foregoing step 2. Details are not described herein again.

Step 6: Superimpose the channel output signal with the noise to obtain an input signal of the 7-level slicer, that is, an input signal of the first device.

With reference to FIG. 8, if the amplitude 1 of the channel output signal at the symbol identifier 1 is 1 after being superimposed with the noise, an amplitude of an input signal of the 7-level slicer at the symbol identifier 1 is 1.

If the amplitude 4 of the channel output signal at the symbol identifier 2 is 4 after being superimposed with the noise, an amplitude of an input signal of the 7-level slicer at the symbol identifier 2 is 4.

If the amplitude 5 of the channel output signal at the symbol identifier 3 is 4 after being superimposed with the noise, an amplitude of an input signal of the 7-level slicer at the symbol identifier 3 is 4. If there is no noise impact, the amplitude of the input signal of the 7-level slicer at the symbol identifier 3 should be equal to the amplitude 5 of the channel output signal at the symbol identifier 3. Therefore, an error occurs herein.

Similarly, the channel output signal is superimposed with the noise to obtain amplitudes of input signals of the 7-level slicer at the symbol identifiers 4 to 20 (as shown in FIG. 8). A specific process is not described herein again. Affected by the noise, an error may occur in the amplitudes of input signals of the 7-level slicer at the symbol identifiers 4 to 20. In this embodiment of this disclosure, an example in which no error is introduced in the amplitudes of the input signals of the 7-level slicer at the symbol identifiers 4 to 20 is used for description.

S402: The first device performs first decoding on the signal to obtain an amplitude of a first decoding output signal.

For example, first decoding is performed on a physical layer signal of the first data block, to obtain the amplitude of the first decoding output signal.

For example, with reference to FIG. 5, the performing first decoding on the signal may include: decoding the signal by using the decision feedback equalizer DFE, to obtain a first decoding output signal, where the first decoding output signal may be used as an input signal of a slicing module of the DFE.

For another example, with reference to FIG. 7, the performing first decoding on the signal may include: decoding the signal by using the 1/(1+D) decoder to obtain a first decoding output signal, where the first decoding output signal may be an output signal of the 1/(1+D) decoder.

Optionally, an amplitude of a current first decoding output signal is determined based on an amplitude of a current first decoding input signal and an amplitude of a previous first decoding output signal.

In some embodiments, that the amplitude of the current first decoding output signal is determined based on the amplitude of the current first decoding input signal and the amplitude of the previous first decoding output signal may include: The amplitude of the current first decoding output signal=the amplitude of the current first decoding input signal−a*an amplitude of a previous output signal of the DFE. a is a factor, for example, a is a tap coefficient of the decision feedback equalizer DFE, 0<a≤1, and the output signal of the DFE is determined based on the first decoding output signal.

With reference to FIG. 5, the output signal of the DFE is a signal obtained after the slicing module of the DFE slices the first decoding output signal, the first decoding input signal is an input signal of the DFE, and the first decoding output signal is an input signal of the slicing module of the DFE.

In some other embodiments, that the amplitude of the current first decoding output signal is determined based on the amplitude of the current first decoding input signal and the amplitude of the previous first decoding output signal may include: The amplitude of the current first decoding output signal=the amplitude of the current first decoding input signal−the amplitude of the previous first decoding output signal.

With reference to FIG. 7, the first decoding input signal is the output signal of the 7-level slicer, and the first decoding output signal is the output signal of the 1/(1+D) decoder.

In a possible design solution, after S402, the retransmission method in this embodiment of this disclosure may further include: determining an amplitude of the signal based on an amplitude interval between the amplitude of the first decoding output signal and the amplitude threshold of the signal.

Figure 9:
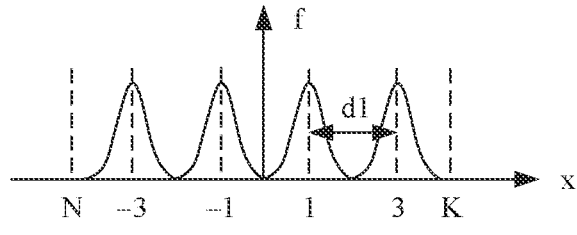
FIG. 9 is a schematic diagram of a PAM4 signal according to an embodiment of this disclosure.

FIG. 9 is a schematic diagram of a PAM4 signal according to an embodiment of this disclosure. As shown in FIG. 9, a horizontal coordinate represents an amplitude x of the signal, a vertical coordinate represents a probability density f of the amplitude of the signal, the first amplitude threshold of the PAM4 signal is −3, the second amplitude threshold is −1, the third amplitude threshold is 1, the fourth amplitude threshold is 3, d1 is an amplitude interval 2 between adjacent amplitude thresholds, N is a first boundary value, and K is a second boundary value. Alternatively, the first amplitude threshold of the PAM4 signal may be 0, the second amplitude threshold may be 1, the third amplitude threshold may be 2, the fourth amplitude threshold may be 3 (not shown in FIG. 9), and d1 is an amplitude interval 1 between adjacent amplitude thresholds.

In some embodiments, the first boundary value N may meet the following formula: $N=M-a*d1$. a is a factor, for example, a is a tap coefficient of the decision feedback equalizer DFE, $0<\alpha<1$, d1 is an amplitude interval between adjacent amplitude thresholds, and M is the first amplitude threshold.

The second boundary value K may meet the following formula: $K=P+a*d1$. a is a factor, for example, a is a tap coefficient of the decision feedback equalizer DFE, $0<a\leq1$, d1 is an amplitude interval between adjacent amplitude thresholds, and P is the fourth amplitude threshold.

In some other embodiments, the first boundary value N may meet the following formula: $N=M-b*a*d1$. b is an empirical value, $0<b\leq1$, a is a factor, for example, a is a tap coefficient of the decision feedback equalizer DFE, $0<a\leq1$, d1 is an amplitude interval between adjacent amplitude thresholds, and M is the first amplitude threshold.

The second boundary value K may meet the following formula: $K=P+b*a*d1$. b is an empirical value, $0<b\leq1$, a is a factor, for example, a is a tap coefficient of the decision feedback equalizer DFE, $0<a\leq1$, d1 is an amplitude interval between adjacent amplitude thresholds, and P is the fourth amplitude threshold. That is, the first boundary value and the second boundary value of the signal may be set according to experience.

It should be noted that, in this embodiment of this disclosure, the four-level pulse amplitude modulation signal is merely used as an example, and a quantity of levels of the signal is not limited. When the signal includes more than four amplitude thresholds, or the signal includes less than four amplitude thresholds, the first amplitude threshold may be the smallest amplitude threshold in the amplitude thresholds included in the signal, and the fourth amplitude threshold may be the largest amplitude threshold in the amplitude thresholds included in the signal.

In some embodiments, the determining an amplitude of the signal based on an amplitude interval between the amplitude of the first decoding output signal and the amplitude threshold of the signal may include: determining the amplitude of the signal as an amplitude threshold that has a minimum amplitude interval with the amplitude of the first decoding output signal.

With reference to FIG. 9, when the amplitude of the first decoding output signal is −3.5, an amplitude interval between the amplitude −3.5 and the amplitude threshold −3 is 0.5, an amplitude interval between the amplitude −3.5 and the amplitude threshold −1 is 2.5, an amplitude interval between the amplitude −3.5 and the amplitude threshold 1 is 4.5, and an amplitude interval between the amplitude −3.5 and the amplitude threshold 3 is 6.5. The amplitude interval between the amplitude −3.5 and the amplitude threshold −3 is the smallest, and therefore the amplitude of the signal may be determined as −3.

In some other embodiments, the determining an amplitude of the signal based on an amplitude interval between the amplitude of the first decoding output signal and the amplitude threshold of the signal may include: determining the amplitude of the signal according to a slicing rule.

For example, the slicing rule may include: if the first boundary value≤Q<(the first amplitude threshold+0.5*d1), the amplitude of the signal may be determined as the first amplitude threshold; if (the first amplitude threshold+0.5*d1)≤Q<(the second amplitude threshold+0.5*d1), the amplitude of the signal may be determined as the second amplitude threshold; if (the second amplitude threshold+0.5*d1)≤Q<(the third amplitude threshold+0.5*d1), the amplitude of the signal may be determined as the third amplitude threshold; or if (the third amplitude threshold+0.5*d1)≤Q<the second boundary value, the amplitude of the signal may be determined as the fourth amplitude threshold. Q is the amplitude of the first decoding output signal, and d1 is the amplitude interval between adjacent amplitude thresholds.

With reference to FIG. 9, the first amplitude threshold is −3, the second amplitude threshold is −1, the third amplitude threshold is 1, and the fourth amplitude threshold is 3. If the amplitude of the first decoding output signal is −3.5, a=1, b=0.55, the first boundary value N=−3−0.55*1*2=−4.1, and the first amplitude threshold+0.5*d1=−3+0.5*2=−2, where −4.1<−3.5<−2, the amplitude of the signal may be determined as −3.

It is assumed that the first amplitude threshold of the PAM4 signal is 0, the second amplitude threshold is 1, the third amplitude threshold is 2, and the fourth amplitude threshold is 3. If the amplitude of the first decoding output signal is 3.5, a=1, b=0.55, the second boundary value K=3+0.55*1*1=3.55, and the third amplitude threshold+0.5*d1=2+0.5*1=2.5, where 2.5<3.5<3.55, the amplitude of the signal may be determined as 3.

In still some embodiments, the determining an amplitude of the signal based on an amplitude interval between the amplitude of the first decoding output signal and the amplitude threshold of the signal may include: if the amplitude of the first decoding output signal is less than the first boundary value, determining the amplitude of the signal as the first amplitude threshold; or if the amplitude of the first decoding output signal is greater than the second boundary value, determining the amplitude of the signal as the fourth amplitude threshold.

With reference to FIG. 9, the first amplitude threshold is −3, the second amplitude threshold is −1, the third amplitude threshold is 1, and the fourth amplitude threshold is 3. If the amplitude of the first decoding output signal is −5, a=1, b=0.55, and the first boundary value N=−3−0.55*1*2=−4.1, where −5<−4.1, the amplitude of the signal may be determined as −3.

It is assumed that the first amplitude threshold of the PAM4 signal is 0, the second amplitude threshold is 1, the third amplitude threshold is 2, and the fourth amplitude threshold is 3. If the amplitude of the first decoding output signal is 4, a=1, b=0.55, and the second boundary value K=3+0.55*1*1=3.55, where 4 is greater than 3.55, the amplitude of the signal may be determined as 3.

For example, following the foregoing step 3, with reference to FIG. 5 and FIG. 6, a=1 and the 1+D channel are used as an example to describe about obtaining the amplitude of the first decoding output signal and determining the amplitude of the signal based on the amplitude interval between the amplitude of the first decoding output signal and the amplitude threshold of the signal. For a specific implementation, refer to the following step 7 and step 8.

Step 7: Perform first decoding on the first decoding input signal to obtain a first decoding output signal.

The first decoding process may include: An amplitude of a current first decoding output signal (the input signal of the DFE slicer)=an amplitude of a current first decoding input signal−an amplitude of a previous output signal of the DFE. The first decoding output signal is the input signal of the DFE slicer in FIG. 6. For an implementation of the amplitude of the DFE output signal, refer to the following step 9.

With reference to FIG. 5 and FIG. 6, an amplitude of a first decoding output signal at the symbol identifier 1=an amplitude 1 of a first decoding input signal at the symbol identifier 1−the amplitude 0 of the previous output signal of the DFE=1. If the amplitude of the previous output signal of the DFE of the first decoding output signal at the symbol identifier 1 does not exist, it may be considered that the amplitude of the previous output signal of the DFE is 0.

An amplitude of a first decoding output signal at the symbol identifier 2=an amplitude 4 of a first decoding input signal at the symbol identifier 2−the amplitude 1 of the output signal of the DFE at the symbol identifier 1=3.

An amplitude of a first decoding output signal at the symbol identifier 3=an amplitude 4 of a first decoding input signal at the symbol identifier 3−the amplitude 3 of the output signal of the DFE at the symbol identifier 2=1.

Similarly, amplitudes of first decoding output signals at the symbol identifiers 4 to 20 are obtained by using the foregoing first decoding process (as shown in FIG. 6). A specific operation process is not described herein again.

Step 8: Obtain the output signal of the DFE based on the amplitude interval between the amplitude of the first decoding output signal and the amplitude threshold of the signal.

For example, if the amplitude 1 of the first decoding output signal at the symbol identifier 1 is determined as the amplitude threshold 1, the amplitude of the output signal of the DFE at the symbol identifier 1 is 1.

If the amplitude 3 of the first decoding output signal at the symbol identifier 2 is sliced as the amplitude threshold 3, the amplitude of the output signal of the DFE at the symbol identifier 2 is 3.

Similarly, amplitudes of output signals of the DFE at the symbol identifiers 3 to 17, 19, and 20 are obtained by using the foregoing slicing process (as shown in FIG. 6). A specific operation process is not described herein again. In the foregoing step 3, because the error is introduced by the noise at the symbol identifier 3, an error occurs in the amplitude of the first decoding output signal at the symbol identifier 3. As a result, an error occurs in the obtained amplitude of the output signal of the DFE at the symbol identifier 3, and the error is transferred to the symbol identifier 17 due to impact of a structure of the DFE.

An amplitude of a first decoding output signal at the symbol identifier 18 is 4, and the second boundary value K=3+0.55*1*1=3.55, where 4 is greater than 3.55. If the amplitude 4 of the first decoding output signal at the symbol identifier 18 is sliced as the amplitude threshold 3, an amplitude of an output signal of the DFE at the symbol identifier 18 is 3, the amplitude of the output signal of the DFE is corrected, and incorrect transfer of the signal is terminated, so that amplitudes of output signals of the DFE at the symbol identifiers 19 and 20 are correct.

For example, following the foregoing step 6, with reference to FIG. 7 and FIG. 8, the foregoing describes about obtaining the amplitude of the first decoding output signal and determining the amplitude of the signal based on the amplitude interval between the amplitude of the first decoding output signal and the amplitude threshold of the signal. For a specific implementation, refer to the following step 9 and step 10.

Step 9: Perform first decoding on the first decoding input signal to obtain a first decoding output signal.

The first decoding process may include: An amplitude of a current first decoding output signal=an amplitude of a current first decoding input signal−an amplitude of a previous output signal of the 1/(1+D) decoder. The amplitude of the first decoding input signal is an amplitude of the output signal of the 7-level slicer in FIG. 8, and the amplitude of the first decoding output signal is an amplitude of the output signal of the 1/(1+D) decoder in FIG. 8.

With reference to FIG. 7 and FIG. 8, an amplitude of a first decoding output signal at the symbol identifier 1=an amplitude 1 of a first decoding input signal at the symbol identifier 1−the amplitude 0 of the previous output signal of the 1/(1+D) decoder=1. If the amplitude of the previous output signal of the 1/(1+D) decoder of the first decoding output signal at the symbol identifier 1 does not exist, it may be considered that the amplitude of the previous output signal of the 1/(1+D) decoder is 0.

An amplitude of a first decoding output signal at the symbol identifier 2=an amplitude 4 of a first decoding input signal at the symbol identifier 2−the amplitude 1 of the output signal of the 1/(1+D) decoder at the symbol identifier 1=3.

Similarly, amplitudes of first decoding output signals at the symbol identifiers 3 to 18 and 20 are obtained by using the foregoing first decoding process (as shown in FIG. 8). A specific operation process is not described herein again.

An amplitude of a first decoding output signal at the symbol identifier 19=an amplitude 3 of a first decoding input signal at the symbol identifier 19−an amplitude 3 of an output signal corrected by the 1/(1+D) decoder at the symbol identifier 18=0. For an implementation of the amplitude of the output signal corrected by the 1/(1+D) decoder, refer to the following step 10. Details are not described herein again.

Step 10: Obtain the output signal corrected by the 1/(1+D) decoder based on the amplitude interval between the amplitude of the first decoding output signal and the amplitude threshold of the signal.

For example, if the amplitude 1 of the first decoding output signal at the symbol identifier 1 is determined as the amplitude threshold 1, the amplitude of the output signal corrected by the 1/(1+D) decoder at the symbol identifier 1 is 1.

Similarly, amplitudes of output signals corrected by the 1/(1+D) decoder at the symbol identifiers 2 to 17, 19, and 20 are obtained by using the foregoing slicing process (as shown in FIG. 8). A specific operation process is not described herein again. In the foregoing step 6, because the error is introduced by the noise at the symbol identifier 3, an error occurs in the amplitude of the first decoding output signal at the symbol identifier 3. As a result, an error occurs in the amplitude of the output signal corrected by the 1/(1+D) decoder at the symbol identifier 3, and the error is transferred to the symbol identifier 17 due to impact of the 1/(1+D) decoder.

An amplitude of a first decoding output signal at the symbol identifier 18 is 4, and the second boundary value K=3+0.55*1*1=3.55, where 4 is greater than 3.55. If the amplitude 4 of the first decoding output signal at the symbol identifier 18 is determined as the amplitude threshold 3, an amplitude of an output signal corrected by the 1/(1+D) decoder at the symbol identifier 18 is 3, the amplitude of the first decoding output signal at the symbol identifier 18 is corrected, and incorrect transfer of the signal is terminated.

S403: The first device determines whether an error occurs in the signal.

In a possible design solution, the determining that the error occurs in the signal may include: if the amplitude of the first decoding output signal is less than the first boundary value or greater than the second boundary value, determining that the error occurs in the signal.

For example, the first decoding output signal may be a physical layer transmission signal of the first data block.

The second boundary value is greater than the first boundary value. For specific implementations of the first boundary value and the second boundary value, refer to S402. Details are not described herein again.

With reference to FIG. 9, it is assumed that a=1, b=0.55, the first boundary value N=−3−0.55*1*2=−4.1, and the second boundary value K=3+0.55*1*2=4.1. If the amplitude of the first decoding output signal is 5, and 5 is greater than 4.1, the error occurs in the signal.

It is assumed that the first amplitude threshold of the PAM4 signal is 0, the second amplitude threshold is 1, the third amplitude threshold is 2, and the fourth amplitude threshold is 3. If the amplitude of the first decoding output signal is 4, a=1, b=0.55, and the second boundary value K=3+0.55*1*1=3.55, where 4 is greater than 3.55, the error occurs in the signal.

For example, following the foregoing step 8, with reference to FIG. 5 and FIG. 6, a=1 and the 1+D channel are used as an example to describe about determining whether the error occurs in the signal. For a specific implementation, refer to the following step 11.

Step 11: Determine whether an error occurs in the first decoding output signal.

With reference to FIG. 6, the first amplitude threshold is 0, the second amplitude threshold is 1, the third amplitude threshold is 2, and the fourth amplitude threshold is 3. It is assumed that a=1 and b=0.55, the first boundary value N=0−0.55*1*1=−0.55, and the second boundary value K=3+0.55*1*1=3.55. If the amplitude of the first decoding output signal is less than ~0.55 or greater than 3.55, the error occurs in the signal.

If amplitudes of first decoding output signals at the symbol identifiers 1 to 17, the symbol identifier 19, and the symbol identifier 20 all range from −0.55 to 3.55, and the amplitude of the first decoding output signal at the symbol identifier 18 (the amplitude of the input signal of the DFE slicer in FIG. 6) is greater than the second boundary value 3.55, it is determined that the error occurs in the signal.

For example, following the foregoing step 8, with reference to FIG. 7 and FIG. 8, the foregoing describes about determining whether the error occurs in the signal. For a specific implementation, refer to the following step 12.

Step 12: Determine whether an error occurs in the first decoding output signal.

If the amplitude of the first decoding output signal is less than the first boundary value or greater than the second boundary value, the error occurs in the signal; otherwise, no error occurs in the signal. For a specific implementation, refer to the foregoing step 11, and details are not described herein again.

S404: The first device determines a first quantity.

The first quantity is a quantity of errors that occur in the signal received from the second device.

Specifically, the first device may count, based on a result of determining, by the first device, whether the error occurs in the signal in S403, a quantity of errors that occur in the signal.

Optionally, the first device may determine the first quantity by using an FEC codeword, a CRC frame, an Ethernet frame, or a specified bit set as a basic granularity. In other words, the first quantity may be a quantity of errors that occur in a signal of a specific length.

As shown in FIG. 6 or FIG. 8, the EoBD determines a quantity of errors that occur in the signal received from the second device, detects, at the symbol identifier 18, that the error occurs in the signal, and sets the EoBD to 1.

Optionally, the first device may perform second decoding on the signal. The following provides descriptions with reference to FIG. 5 and FIG. 6.

Step 13: Decode the signal by using the (1+D) decoder to obtain the output signal of the (1+D) decoder.

For example, the second decoding process may include: An amplitude of a current output signal of the (1+D) decoder=(an amplitude of a current input signal of the (1+D) decoder+an amplitude of a previous input signal of the (1+D) decoder) mod 4, where mod is a modulo operation.

With reference to FIG. 6, the input signal of the (1+D) decoder is the output signal of the DFE. An amplitude of an output signal of the (1+D) decoder at the symbol identifier 1=(an amplitude 1 of an input signal of the (1+D) decoder at the symbol identifier 1+the amplitude 0 of the previous input signal of the (1+D) decoder) mod 4=1. If the previous input signal of the (1+D) decoder of the encoded input symbol at the symbol identifier 1 does not exist, it may be considered that the amplitude of the previous input signal of the (1+D) decoder is 0.

An amplitude of an output signal of the (1+D) decoder at the symbol identifier 2=(an amplitude 3 of an input signal of the (1+D) decoder at the symbol identifier 2+the amplitude 1 of the input signal of the (1+D) decoder at the symbol identifier 1) mod 4=0.

An amplitude of an output signal of the (1+D) decoder at the symbol identifier 3=(an amplitude 1 of an input signal of the (1+D) decoder at the symbol identifier 3+the amplitude 3 of the input signal of the (1+D) decoder at the symbol identifier 2) mod 4=0.

Similarly, amplitudes of output signals of the (1+D) decoder at the symbol identifiers 4 to 17 are obtained by using the foregoing second decoding process (as shown in FIG. 6). A specific operation process is not described herein again.

Because an error in the first decoding output signal is detected at the symbol identifier 18, an amplitude of an output signal of the (1+D) decoder at the symbol identifier 18=(an amplitude 4 of a first decoding output signal at the symbol identifier 18+an amplitude 0 of an input signal of the (1+D) decoder at the symbol identifier 17) mod 4=0, where the first decoding output signal is the input signal of the DFE decider in FIG. 6.

An amplitude of an output signal of the (1+D) decoder at the symbol identifier 19=(an amplitude 0 of an input signal of the (1+D) decoder at the symbol identifier 19+the amplitude 3 of the input signal of the (1+D) decoder at the symbol identifier 18) mod 4=3.

An amplitude of an output signal of the (1+D) decoder at the symbol identifier 20=(an amplitude 3 of an input signal of the (1+D) decoder at the symbol identifier 20+the amplitude 0 of the input signal of the (1+D) decoder at the symbol identifier 19) mod 4=3.

With reference to FIG. 6, after second decoding, the amplitude 0 of the output signal of the (1+D) decoder at the symbol identifier 3 is different from the amplitude 1 of the input signal of the 1/(1+D) encoder at the symbol identifier 3, and the error occurs in the signal at the symbol identifier 3. An amplitude of an output signal of the (1+D) decoder at another symbol identifier is correspondingly the same as the amplitude of the input signal of the 1/(1+D) encoder.

The following describes the second decoding with reference to FIG. 7 and FIG. 8.

Step 14: Decode the signal by using the (1+D) decoder to obtain the output signal of the (1+D) decoder.

For example, the second decoding process may include: An amplitude of a current output signal of the (1+D) decoder=(an amplitude of a current input signal of the (1+D) decoder+an amplitude of a previous input signal of the (1+D) decoder) mod 4, where mod is a modulo symbol.

With reference to FIG. 8, the input signal of the (1+D) decoder is the output signal corrected by the 1/(1+D) decoder. For a specific implementation, refer to the foregoing step 13, and details are not described herein again.

S405: The first device determines, based on a relationship between the first quantity and a first threshold, whether to request the second device to send the first data block.

In a possible design solution, that the first device determines, based on a relationship between the first quantity and a first threshold, whether to request a second device to send a first data block may include: if the first quantity is greater than the first threshold, the first device may perform S406.

The first threshold may be a maximum quantity of errors that can be corrected when the first device decodes the first data block.

Optionally, the maximum quantity of errors that can be corrected when the first data block performs decoding may refer to an error correction capability of the FEC module. When the first device does not include the FEC module, the first threshold may be 0.

For example, the error correction capability t of the FEC module may be a maximum quantity of symbols that can be successfully corrected by one RS codeword and that allow an error. The error correction capability t of the FEC module may meet the following formula $t=(N-K)/2$, where N is an RS codeword length, and K is an RS codeword information length.

For example, for an RS (528, 514), where 528 is the RS codeword length, and 514 is the RS codeword information length, the error correction capability $t=(528-514)/2=7$.

For another example, for an RS (544, 514), 544 is the RS codeword length, 514 is the RS codeword information length, and the error correction capability $t=(544-514)/2=15$.

In a possible design solution, the retransmission method may further include: decoding the first data block, and/or performing cyclic redundancy check on the first data block. In other words, a solution of determining, at a physical layer, whether the error occurs in the signal may be used in combination with the FEC technology and/or the CRC technology, to further reduce a probability of missed error detection and improve reliability of data transmission.

For example, the first device may decode the first data block by using the FEC codeword length as a basic granularity, and/or the first device may perform cyclic redundancy check on the first data block by using the CRC frame length as a basic granularity.

Further, in some embodiments, if a second condition is met, the first device may perform the following S406.

The second condition may include one or more of the following: the first quantity is greater than the first threshold, the first data block fails to be decoded, or the first data block fails to be checked In other words, when any one or more of the conditions included in the second condition are met, the first device may request the second device to resend the first data block, thereby improving data transmission reliability.

In some other embodiments, if the first quantity is greater than the first threshold and meets a third condition, the first device may perform the following S406.

The third condition may include that the first data block is successfully decoded and/or the first data block is successfully checked. This can resolve a problem of low data transmission reliability caused by incorrect correction in a process of decoding the first data block. In other words, when it is determined that the first quantity is greater than the first threshold, decoding succeeds. This may be because incorrect correction occurs, and error data is actually not corrected. In this case, the first device may request to retransmit the first data block, to improve data transmission reliability.

In still some embodiments, if the first quantity is less than or equal to the first threshold and meets a first condition, the first device may perform the following S406.

The first condition may include that the first data block fails to be decoded and/or the first data block fails to be checked. In other words, when the first quantity is less than or equal to the first threshold, the FEC technology and the CRC technology may be used to reduce a probability of missed error detection, thereby improving data transmission reliability.

S406: The first device requests the second device to send the first data block.

Optionally, that the first device requests the second device to send the first data block may include: sending a first request to the second device. The first request may be used to request the second device to send the first data block.

Based on the retransmission method shown in FIG. 4, the first device may count a quantity of errors that occur in a physical layer signal, corresponding to the first data block, received from the second device, and determine, based on the quantity of errors that occur in the signal and a decoding error correction capability of the first device, for example, a maximum quantity of errors that can be corrected when the first device performs decoding, whether to request the second device to resend the first data block. In this way, before the first data block is decoded and checked, error information is extracted from the physical layer signal, so that a data transmission latency can be reduced, and an error detection capability of the first device can be improved, thereby improving data transmission efficiency and data transmission reliability.

The retransmission method provided in embodiments of this disclosure is described in detail above with reference to FIG. 4 to FIG. 9. The following describes in detail a communication apparatus provided in an embodiment of this disclosure with reference to FIG. 10.

Figure 10:
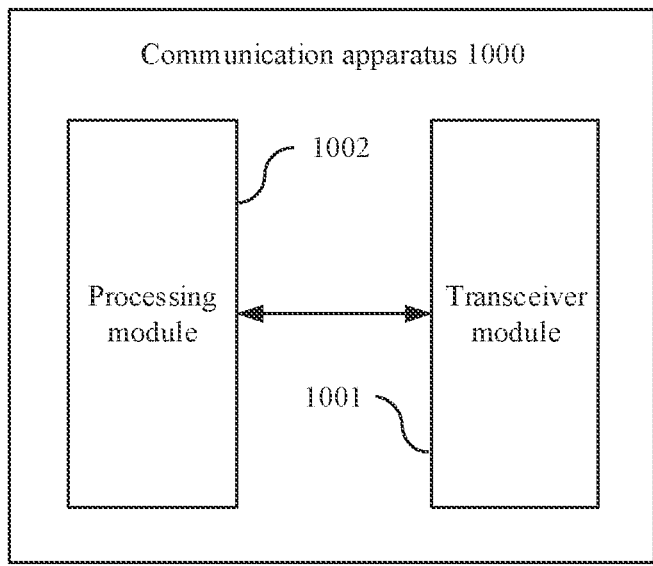
FIG. 10 is a schematic diagram 2 of a structure of a communication apparatus according to an embodiment of this disclosure.

FIG. 10 is a schematic diagram 2 of a structure of a communication apparatus according to an embodiment of this disclosure. The communication apparatus may be applied to the communication system shown in FIG. 1, and perform a function of the first device in the retransmission method shown in FIG. 4. For ease of description, FIG. 10 shows only main components of the communication apparatus.

As shown in FIG. 10, the communication apparatus 1000 includes a transceiver module 1001 and a processing module 1002.

The processing module 1002 is configured to determine a first quantity. The first quantity is a quantity of errors that occur in a signal received from a second device, and the signal is used to transmit a first data block.

The processing module 1002 is further configured to determine, based on a relationship between the first quantity and a first threshold, whether to control the transceiver module 1001 to request the second device to send the first data block. The first threshold is a maximum quantity of errors that can be corrected when the processing module 1002 decodes the first data block.

Optionally, that the error occurs in the signal may include: an amplitude of a first decoding output signal is less than a first boundary value or greater than a second boundary value. The second boundary value is greater than the first boundary value, and the amplitude of the first decoding output signal is determined based on an amplitude of a current first decoding input signal and an amplitude of a previous first decoding output signal.

Optionally, an amplitude threshold of the signal includes a first amplitude threshold, a second amplitude threshold, a third amplitude threshold, and a fourth amplitude threshold, the first amplitude threshold is less than the second amplitude threshold, the second amplitude threshold is less than the third amplitude threshold, and the third amplitude threshold is less than the fourth amplitude threshold. The first boundary value N is: $N=M-a*d1$. a is a factor, $0<a \leq 1$, d1 is an amplitude interval between adjacent amplitude thresholds, and M is the first amplitude threshold. The second boundary value K is $K=P+a*d1$. a is a factor, $0<a \leq 1$, d1 is an amplitude interval between adjacent amplitude thresholds, and P is the fourth amplitude threshold.

In a possible design solution, the processing module 1002 is further configured to determine an amplitude of the signal based on an amplitude interval between the amplitude of the first decoding output signal and the amplitude threshold of the signal.

In a possible design solution, the processing module 1002 is further configured to: if the amplitude of the first decoding output signal is less than the first boundary value, determine the amplitude of the signal as the first amplitude threshold. The processing module 1002 is further configured to: if the amplitude of the first decoding output signal is greater than the second boundary value, determine the amplitude of the signal as the fourth amplitude threshold.

In a possible design solution, the processing module 1002 is further configured to: if the first quantity is greater than the first threshold, control the transceiver module 1001 to request the second device to send the first data block.

In a possible design solution, the processing module 1002 is further configured to decode the first data block; and/or the processing module 1002 is further configured to perform cyclic redundancy check on the first data block.

In a possible design solution, the processing module 1002 is further configured to: if the first quantity is less than or equal to the first threshold and meets a first condition, control the transceiver module 1001 to request the second device to send the first data block. The first condition includes that the first data block fails to be decoded and/or the first data block fails to be checked.

In another possible design solution, the processing module 1002 is further configured to: if a second condition is met, control the transceiver module 1001 to request the second device to send the first data block. The second condition includes one or more of the following: the first quantity is greater than the first threshold, the first data block fails to be decoded, or the first data block fails to be checked In still another possible design solution, the processing module 1002 is further configured to: if the first quantity is greater than the first threshold and meets a third condition, control the transceiver module 1001 to request the second device to send the first data block. The third condition includes that the first data block is successfully decoded and/or the first data block is successfully checked.

Optionally, the first data block includes an FEC codeword, a CRC frame, an Ethernet frame, or a specified bit set.

It should be noted that the transceiver module 1001 may include a receiving module and a sending module (not shown in FIG. 10). The receiving module is configured to receive data and/or signaling from the second device. The sending module is configured to send a first request to the second device, where the first request is used to request the second device to send the first data block, or is used to send other data and/or signaling to the second device. A specific implementation of the transceiver module 1001 is not specifically limited in this disclosure.

Optionally, the communication apparatus 1000 may further include a storage module (not shown in FIG. 10). The storage module stores a program or instructions. When the processing module 1002 executes the program or the instructions, the communication apparatus 1000 is enabled to perform the function of the first device in the retransmission method shown in FIG. 4.

It should be noted that the communication apparatus 1000 may be the first device shown in FIG. 1 or the communication apparatus 300 shown in FIG. 3, or may be a chip (system) or another component or component that can be disposed in the first device or the communication apparatus 300. This is not limited in this disclosure.

In addition, for a technical effect of the communication apparatus 1000, refer to the technical effect of the retransmission method shown in FIG. 4. Details are not described herein again.

An embodiment of this disclosure provides a communication system. The system includes a first device and a second device.

An embodiment of this disclosure provides a computer-readable storage medium. The computer-readable storage medium includes a computer program or instructions. When the computer program or the instructions are run on a computer, the computer is enabled to perform the retransmission method in the foregoing method embodiments.

An embodiment of this disclosure provides a computer program product, including a computer program or instructions. When the computer program or instructions are run on a computer, the computer is enabled to perform the retransmission method in the foregoing method embodiments.

It should be understood that, the processor in embodiments of this disclosure may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (random access memory, RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and indicates that there may be three relationships. For example, A and/or B may indicate the following three cases: Only A exists, both A and B exist, and only B exists. A and B may be singular or plural. In addition, the character "/" in this specification usually indicates an "or" relationship between associated objects, or may indicate an "and/or" relationship. A specific meaning depends on the context.

In this disclosure, at least one means one or more, and a plurality of means two or more. At least one of the following items (pieces) or a similar expression thereof refers to any combination of these items, including any combination of singular items (pieces) or plural items (pieces). For example, at least one item (piece) of a, b, or c may represent a, b, c, a and b, a and c, b and c, or a, b, and c, where a, b, and c each may be singular or plural.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

A person of ordinary skill in the art may be aware that, in combination with the examples described in embodiments disclosed in this specification, units or modules, and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit or module, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units or modules is merely logical function division, or may be other division in actual implementation. For example, a plurality of units or modules may be combined or integrated into another system, some units or modules may be ignored, or functions corresponding some units or modules are not performed. In addition, the displayed or discussed mutual couplings or direct couplings or communication connections may be implemented through some interfaces. The indirect couplings or communication connections between the apparatuses or units/modules may be implemented in electrical, mechanical, or other forms.

The units/modules described as separate parts may or may not be physically separate, and parts displayed as units/modules may or may not be physical units/modules, may be located in one position, or may be distributed on a plurality of network units/modules. Some or a part of the units/modules may be selected based on actual requirements to achieve the objectives of the solutions of embodiments.

In addition, the functional units/modules in embodiments of this disclosure may be integrated into one processing unit/module, each of the units/modules may exist alone physically, or two or more units/modules are integrated into one unit/module.

When the functions are implemented in a form of a software functional unit/module and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device)

to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A retransmission method, wherein the method comprises:

receiving, at a first device, a signal from a second device;

determining, by the first device, a first quantity, wherein the first quantity is a quantity of one or more errors that occur in the signal received from the second device, and the signal is used to transmit a first data block, wherein an occurrence of each error in the one or more errors occur comprises that an amplitude of a first decoding output signal is less than a first boundary value or greater than a second boundary value, wherein the second boundary value is greater than the first boundary value, and the amplitude of the first decoding output signal is determined based on an amplitude of a current first decoding input signal and an amplitude of a previous first decoding output signal;

determining, by the first device based on a relationship between the first quantity and a first threshold, whether to request the second device to send the first data block, wherein the first threshold is a maximum quantity of errors that are corrected when the first device decodes the first data block; and based on the relationship between the first quantity and the first threshold, transmitting a request to the second device to send the first data block.

2. The retransmission method of claim 1, wherein an amplitude threshold of the signal comprises a first amplitude threshold, a second amplitude threshold, a third amplitude threshold, and a fourth amplitude threshold, the first amplitude threshold is less than the second amplitude threshold, the second amplitude threshold is less than the third amplitude threshold, and the third amplitude threshold is less than the fourth amplitude threshold;

the first boundary value N is $N=M-a*d1$, wherein a is a factor, $0<a\leq1$, d1 is an amplitude interval between adjacent amplitude thresholds, and M is the first amplitude threshold; and the second boundary value K is $K=P+a*d1$, wherein a is a factor, $0<a\leq1$, d1 is an amplitude interval between adjacent amplitude thresholds, and P is the fourth amplitude threshold.

3. The retransmission method of claim 2, wherein the method further comprises:

determining, by the first device, an amplitude of the signal based on an amplitude interval between the amplitude of the first decoding output signal and the amplitude threshold of the signal.

4. The retransmission method of claim 3, wherein the determining, by the first device, an amplitude of the signal based on an amplitude interval between the amplitude of the first decoding output signal and the amplitude threshold of the signal comprises:

if the amplitude of the first decoding output signal is less than the first boundary value, determining, by the first device, the amplitude of the signal as the first amplitude threshold; or if the amplitude of the first decoding output signal is greater than the second boundary value, determining, by the first device, the amplitude of the signal as the fourth amplitude threshold.

5. The retransmission method of claim 1, wherein the determining, by the first device based on a relationship between the first quantity and a first threshold, whether to request the second device to send the first data block comprises:

if the first quantity is greater than the first threshold, determining to request the second device to send the first data block.

6. The retransmission method of claim 1, wherein the method further comprises:

decoding, by the first device, the first data block; or performing cyclic redundancy check on the first data block.

7. The retransmission method of claim 1, wherein the method further comprises:

if the first quantity is less than or equal to the first threshold and meets a first condition, determining to request the second device to send the first data block, wherein the first condition comprises at least one of that the first data block fails to be decoded or that the first data block fails to be checked; or if a second condition is met, determining to request the second device to send the first data block, wherein the second condition comprises one or more of the following: the first quantity is greater than the first threshold, the first data block fails to be decoded, or the first data block fails to be checked; or if the first quantity is greater than the first threshold and meets a third condition determining to request the second device to send the first data block, wherein the third condition comprises at least one of that the first data block is successfully decoded or that the first data block is successfully checked.

8. The retransmission method of claim 1, wherein the first data block comprises a forward error correction (FEC) codeword, a cyclic redundancy check (CRC) frame, an Ethernet frame, or a specified bit set.

9. A communication apparatus, wherein the communication apparatus comprises:

at least one processor, and one or more memories coupled to the at least one processor and storing programming instructions for execution by the at least one processor to cause the apparatus to perform following operations:

receiving, at a first device, a signal from a second device;

determining, by the first device, a first quantity, wherein the first quantity is a quantity of one or more error that occur in the signal received from the second device, and the signal is used to transmit a first data block, wherein an occurrence of each error in the one or more errors occur comprises that an amplitude of a first decoding output signal is less than a first boundary value or greater than a second boundary value, wherein the second boundary value is greater than the first boundary value, and the amplitude of the first decoding output signal is determined based on an amplitude of a current first decoding input signal and an amplitude of a previous first decoding output signal;

determining, by the first device based on a relationship between the first quantity and a first threshold, whether to request the second device to send the first data block, wherein the first threshold is a maximum quantity of errors that are corrected when the first device decodes the first data block; and based on the relationship between the first quantity and the first threshold, transmitting a request to the second device to send the first data block.

10. The communication apparatus of claim 9, wherein an amplitude threshold of the signal comprises a first amplitude threshold, a second amplitude threshold, a third amplitude threshold, and a fourth amplitude threshold, the first amplitude threshold is less than the second amplitude threshold, the second amplitude threshold is less than the third amplitude threshold, and the third amplitude threshold is less than the fourth amplitude threshold;

the first boundary value N is N=M−a*d1, wherein a is a factor, 0<a≤1, d1 is an amplitude interval between adjacent amplitude thresholds, and M is the first amplitude threshold; and the second boundary value K is K=P+a*d1, wherein a is a factor, 0<a≤1, d1 is an amplitude interval between adjacent amplitude thresholds, and P is the fourth amplitude threshold.

11. The communication apparatus of claim 10, wherein the operations comprise:

determining, by the first device, an amplitude of the signal based on an amplitude interval between the amplitude of the first decoding output signal and the amplitude threshold of the signal.

12. The communication apparatus of claim 11, wherein determining the amplitude of the signal based on an amplitude interval between the amplitude of the first decoding output signal and the amplitude threshold of the signal comprises:

if the amplitude of the first decoding output signal is less than the first boundary value, determining, by the first device, the amplitude of the signal as the first amplitude threshold; or if the amplitude of the first decoding output signal is greater than the second boundary value, determining, by the first device, the amplitude of the signal as the fourth amplitude threshold.

13. The communication apparatus of claim 9, wherein determining, by the first device based on the relationship between the first quantity and the first threshold, whether to request the second device to send the first data block comprises:

if the first quantity is greater than the first threshold, determining to request the second device to send the first data block.

14. The communication apparatus of claim 9, wherein the operations comprise:

decoding, by the first device, the first data block; or performing cyclic redundancy check on the first data block.

15. The communication apparatus of claim 9, wherein the operations comprise:

in response to that the first quantity is less than or equal to the first threshold and meets a first condition, determining to request the second device to send the first data block, wherein the first condition comprises at least one of that the first data block fails to be decoded or that the first data block fails to be checked; or if a second condition is met, determining to request the second device to send the first data block, wherein the second condition comprises one or more of the following: the first quantity is greater than the first threshold, the first data block fails to be decoded, or the first data block fails to be checked; or if the first quantity is greater than the first threshold and meets a third condition, determining to request the second device to send the first data block, wherein the third condition comprises at least one of that the first data block is successfully decoded or that the first data block is successfully checked.

16. The communication apparatus of claim 9, wherein the first data block comprises an FEC codeword, a CRC frame, an Ethernet frame, or a specified bit set.

17. A non-transitory computer-readable storage medium, wherein the computer-readable storage medium comprises a computer program or instructions, and when the computer program or the instructions are run on a computer, cause the computer to perform operations comprising:

receiving, at a first device, a signal from a second device;

determining, by the first device, a first quantity, wherein the first quantity is a quantity of one or more errors that occur in the signal received from the second device, and the signal is used to transmit a first data block, wherein an occurrence of each error in the one or more errors occur comprises that an amplitude of a first decoding output signal is less than a first boundary value or greater than a second boundary value, wherein the second boundary value is greater than the first boundary value, and the amplitude of the first decoding output signal is determined based on an amplitude of a current first decoding input signal and an amplitude of a previous first decoding output signal;

determining, by the first device based on a relationship between the first quantity and a first threshold, whether to request the second device to send the first data block, wherein the first threshold is a maximum quantity of errors that are corrected when the first device decodes the first data block; and based on the relationship between the first quantity and the first threshold, transmitting a request to the second device to send the first data block.

18. The non-transitory computer-readable storage medium of claim 17, wherein an amplitude threshold of the signal comprises a first amplitude threshold, a second amplitude threshold, a third amplitude threshold, and a fourth amplitude threshold, the first amplitude threshold is less than the second amplitude threshold, the second amplitude threshold is less than the third amplitude threshold, and the third amplitude threshold is less than the fourth amplitude threshold;

the first boundary value N is $N=M-a*d1$, wherein a is a factor, $0<a\leq1$, d1 is an amplitude interval between adjacent amplitude thresholds, and M is the first amplitude threshold; and the second boundary value K is $K=P+a*d1$, wherein a is a factor, $0<a\leq1$, d1 is an amplitude interval between adjacent amplitude thresholds, and P is the fourth amplitude threshold.

19. The non-transitory computer-readable storage medium of claim 18, wherein the operations further comprise:

determining an amplitude of the signal based on an amplitude interval between the amplitude of the first decoding output signal and the amplitude threshold of the signal.

20. The non-transitory computer-readable storage medium of claim 19, wherein the determining, by the first device, an amplitude of the signal based on an amplitude interval between the amplitude of the first decoding output signal and the amplitude threshold of the signal comprises:

if the amplitude of the first decoding output signal is less than the first boundary value, determining, by the first device, the amplitude of the signal as the first amplitude threshold; or if the amplitude of the first decoding output signal is greater than the second boundary value, determining, by the first device, the amplitude of the signal as the fourth amplitude threshold.

* * * * *